Figure 4:
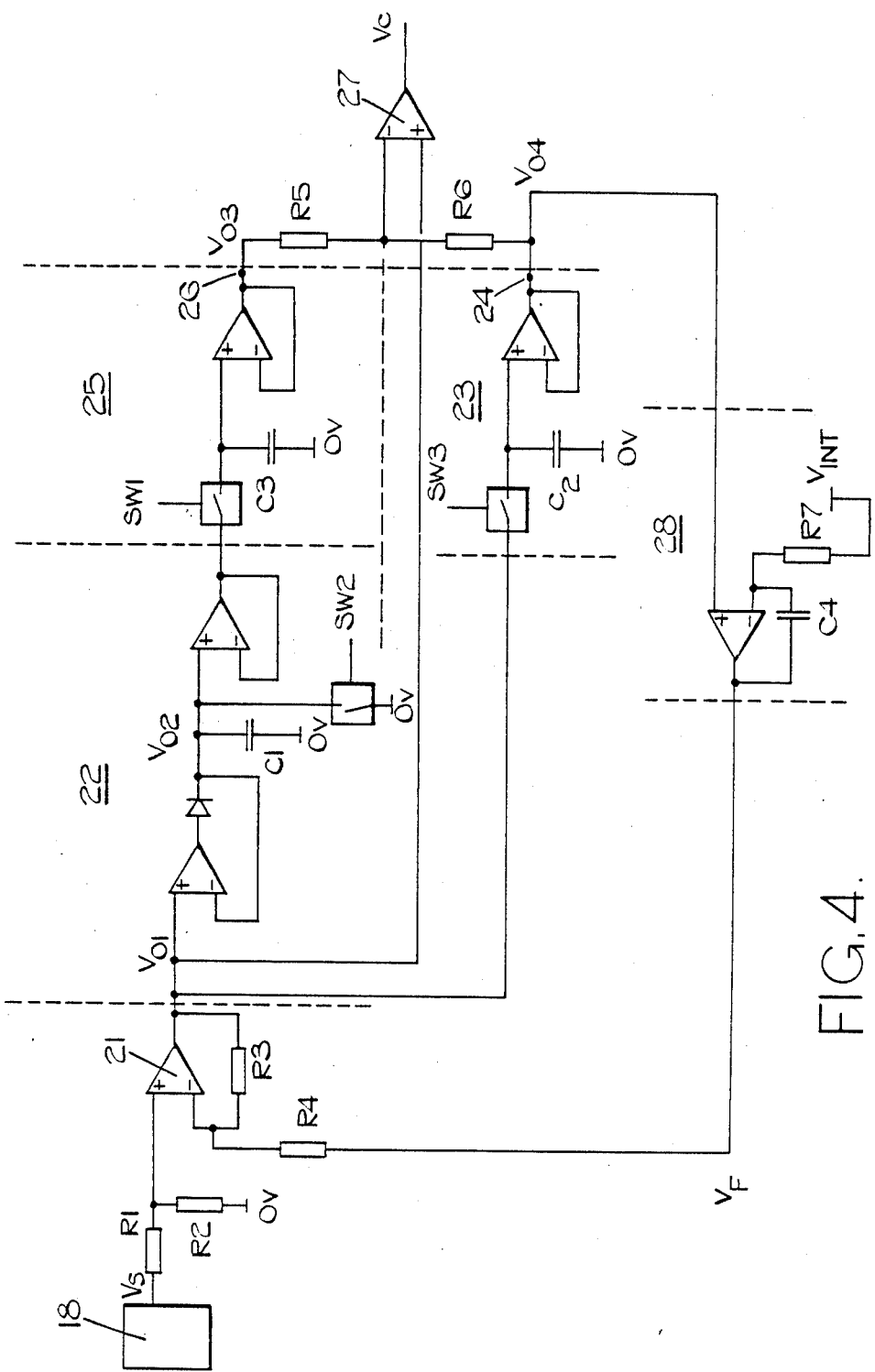

United States Patent [19]

Anthony et al.

[11] Patent Number: 4,700,143
[45] Date of Patent: Oct. 13, 1987

[54] OUTPUT CORRECTION CIRCUIT FOR TRANSDUCER MEANS

[75] Inventors: Peter L. Anthony, Witney; Ian J. Harvey, Cricklade, both of England

[73] Assignee: Lucas Industries public limited company, Birmingham, England

[21] Appl. No.: 773,120

[22] Filed: Sep. 6, 1985

[51] Int. Cl.$^4$ .................. H03K 5/00; H03K 5/159; F02D 31/00
[52] U.S. Cl. .................. 328/151; 123/357; 307/353; 307/308; 328/1
[58] Field of Search .............. 307/352, 353, 308–311; 328/150, 151, 1–5

[56] References Cited

U.S. PATENT DOCUMENTS 4,198,608  5/1980  Comley .................. 328/151
4,373,141  2/1983  Sanders ................. 328/151
4,390,844  6/1983  Ting .................... 328/151

Primary Examiner—Stanley D. Miller
Assistant Examiner—B. P. Davis

[57] ABSTRACT

A transducer means for sensing the movement of a component between first and second extreme positions includes a transducer 18 the output of which is applied to one input terminal of a differential amplifier. The output of the amplifier is applied to one input of a comparator at the output of which appears the output signal. The other input of the comparator is a voltage obtained from a resistor chain connected to the outputs of first and second sample and hold circuits the first of which is connected to the output of the differential amplifier and the second of which is connected to a peak hold circuit. The other input of the differential amplifier is connected to an integrator which integrates the signal provided by the first sample and hold circuit.

2 Claims, 5 Drawing Figures

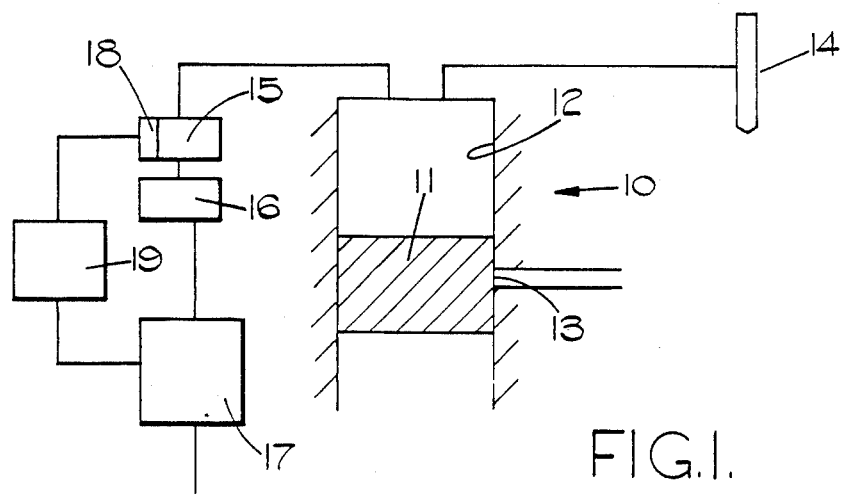
FIG.1.
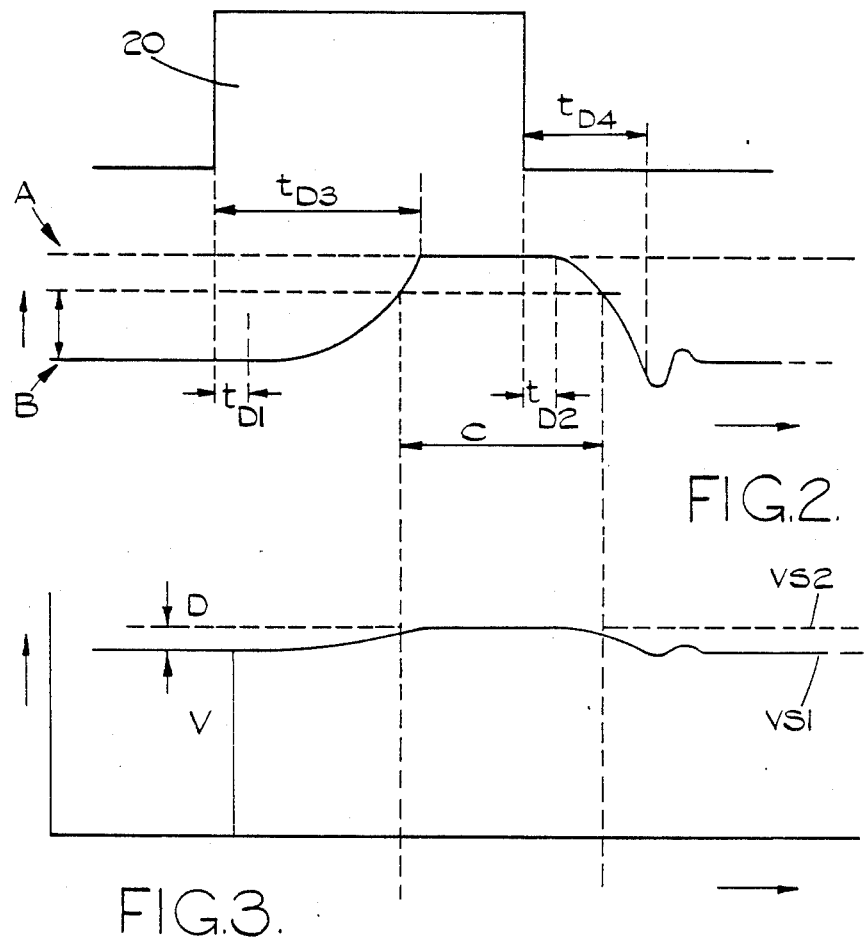
FIG.2.
FIG.3.

OUTPUT CORRECTION CIRCUIT FOR TRANSDUCER MEANS

This invention relates to transducer means for sensing the movement of a component which can move between first and second extreme positions, the transducer means comprising a transducer and electrical circuit means which receives the output signal of the transducer and provides a corrected output signal indicative of when the component is at or near said second extreme position.

An application for such a transducer means lies in a fuel injection pump for supplying fuel to an internal combustion engine, and of the type employing a solenoid operable spill valve which is closed to allow delivery of fuel by the pump to an associated engine. With such a valve the time considered in terms of movement of the pumping element of the pump during which the valve is closed, determines the amount of fuel which is delivered to an associated engine. The performance of the valve/solenoid combination is not sufficiently predictable to enable the quantity of fuel supplied to the engine to be accurately determined by inspection of the current flowing in the solenoid. It has been proposed to provide a position transducer responsive to the movement of the spill valve but such a transducer also suffers from a number of disadvantages. Firstly the movement of the valve is small so that the change in output is small and significant amplification is required in order to achieve sufficient accuracy. Secondly the output has a large d.c. component which allows limited amplification before amplifier saturation occurs, thirdly the output of the transducer may drift due to temperature variation and fourthly due to tolerances in the transducer and the component, differences occur between different installations.

The object of the invention is to provide a transducer means in a simple and convenient form.

According to the invention in a transducer means of the kind specified said electrical circuit means comprises a differential amplifier having one input connected to receive the output signal of said transducer, a first sample and hold circuit having an output terminal and incorporating switch means operable when said component is at its first position to provide at its output terminal a voltage corresponding to the output voltage of the differential amplifier, a peak hold circuit responsive to the output of the differential amplifier and including switch means operable when said component is at its second position to reset the output of the peak hold circuit to zero, a second sample and hold circuit having an output terminal and incorporating switch means operable when said component is at its first position to provide at its output terminal a voltage corresponding to the output of the peak hold circuit, a resistor network connecting the output terminals of said first and second sample and hold circuits, a comparator, said resistor network providing one input to said comparator the other input of which is connected to the output of the differential amplifier and a feedback circuit connected to the other input of the differential amplifier and responsive to the output voltage of the first sample and hold circuit, said comparator having an output terminal at which appears said corrected output signal.

Figure 5:
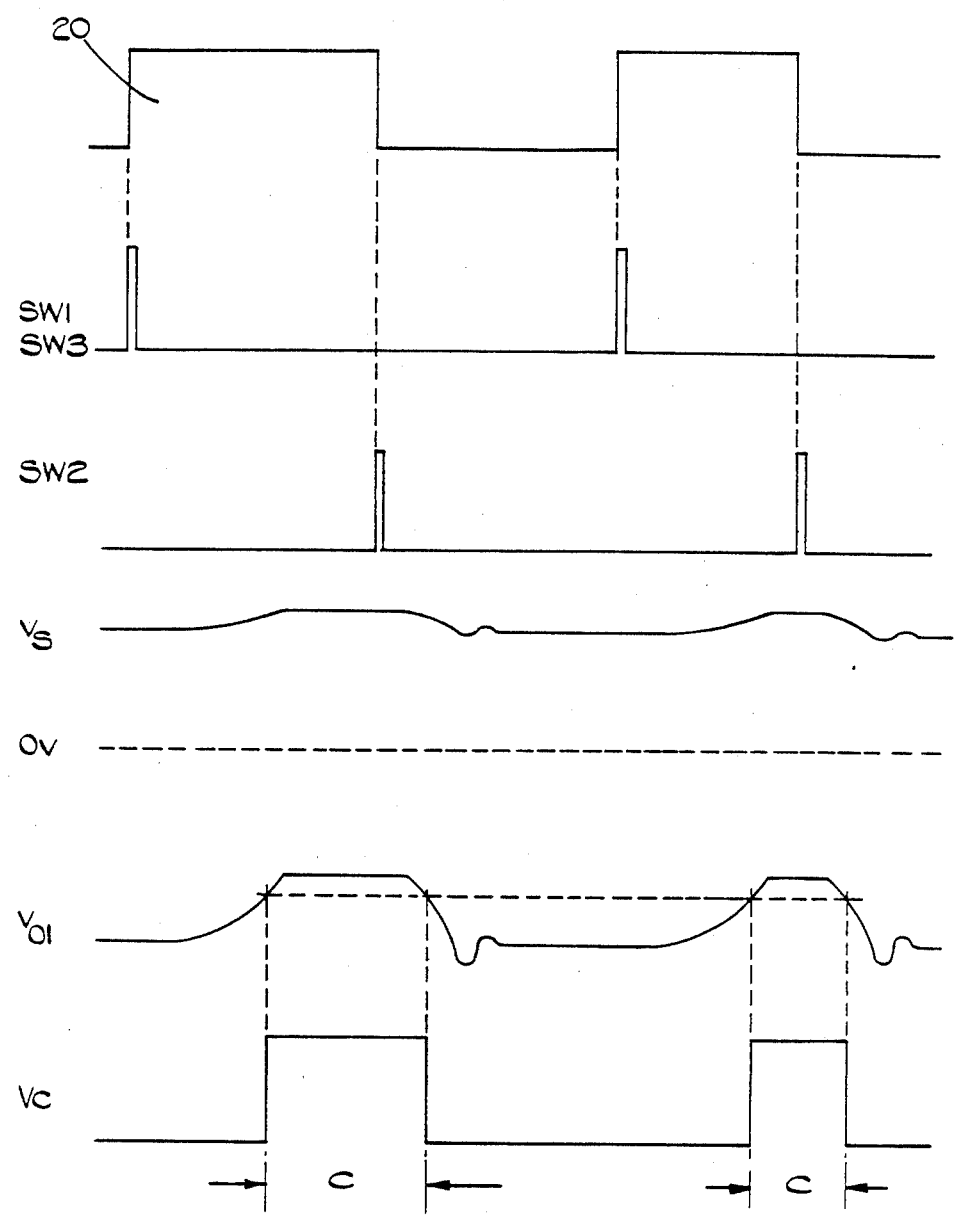

An example of a transducer means in accordance with the invention will now be described with reference to the accompanying drawings in which:

FIG. 1 is a diagrammatic view of a fuel injection pump for suppying fuel to an internal combustion engine, FIG. 2 shows the relation between the movement of the spill valve and the control pulse supplied to the power circuit/solenoid of the spill valve, FIG. 3 shows the output voltage of a transducer, FIG. 4 shows a circuit diagram of the circuit means associated with the transducer, and FIG. 5 shows switching pulses and various voltages at various points in the system.

Referring to FIG. 1 of the drawings a fuel injection pump generally indicated at 10 includes a plunger 11 slidable within a bore 12. The plunger is actuated in timed relationship with the associated engine and may be driven by a cam. Formed in the wall of the bore 12 is a fuel inlet 13 which is connected to a source of fuel not shown. Fuel can flow into the bore by way of the inlet 13 when the latter is uncovered by the plunger and during the inward movement of the plunger the inlet 13 is covered and the fuel contained in the close end of the bore 12 is pressurized. A fuel injection nozzle indicated at 14 is connected to the closed end of the bore and receives fuel during inward movement of the plunger after the inlet 13 has been covered. The amount of fuel flowing through the injection nozzle is determined by a spill valve 15 which when opened, allows fuel from the bore to be displaced for example to a drain so that no fuel is supplied to the nozzle. The spill valve 15 is operated by an electromechanical actuator 16 which receives power from a governor circuit 17 the latter receiving signals by way of transducers not shown, which enable it to determine the position of the plunger and engine so that delivery of fuel occurs at the desired engine position and extends until the required amount of fuel has been supplied to the engine. The movement of the spill valve is sensed by a position transducer 18 which by way of circuit means 19 to be described, provides a spill valve position signal to the governor circuit 17.

The governor circuit 17 includes a power output stage which receives a control pulse indicated at 20 in FIG. 2, when it is required to close the spill valve. Although every effort is made to ensure that the spill valve starts to close as quickly as possible, the actuator is an inductive device and the current cannot rise instantaneously. A time interval TD1 therefore lapses before movement of the spill valve takes place. Only when the time interval TD3 has lapsed can the spill valve be said to be fully closed, the fully closed position being indicated by "A". Moreover, when the control pulse is removed indicating the requirement to open the valve, the spill valve remains in the closed position until a time interval TD2 has lapsed following which the spill valve starts to open but it is only fully open after a time interval TD4 following the end of the control pulse. The fully open position is indicated by "B". In fact the construction of the spill valve is such that a small overshoot occurs after the end of the time interval TD4. Moreover, it has been fund with this form of valve that delivery of fuel starts to take place to the injection nozzle before the spill valve member has moved to the fully closed position and similarly delivery of fuel continues to take place after the spill valve has started to move to its open position. The "effective closure time" of the spill valve is indicated at C in FIGS. 2 and 3 and it will be seen therefore that the spill valve is said to be effectively closed slightly before the end of the time interval TD3 and for a period after the end of the time interval TD2.

The transducer 18 is a position transducer of the Hall effect type and its output voltage is indicated in FIG. 3. The variatin D of the output signal is comparatively small as compared with the standing d.c. voltage V and the output signal of the transducer is therefore processed in the circuit means 19 to achieve the desired accuracy.

The circuit means 19 is shown in detail in FIG. 4 and with reference to FIG. 4, the transducer output is applied by way of a potential divider network comprising resistors R1 and R2, to the non-inverting input terminal of a high gain amplifier 21 connected as a differential amplifier having its output terminal connected by way of resistor R3 to the inverting input terminal. The output of the amplifier 21 is connected to a peak hold circuit 22 incorporating a capacitor C1 and also incorporating switch SW2 which can be closed as will be explained, to zero the output of the peak hold circuit.

The output of the differential amplifier 21 is also applied to a first sample and hold circuit 23 which includes a capacitor C2 and also a switch SW3 which can be closed so that the circuit samples and holds the output voltage of the differential amplifier 21. The first sample and hold circuit is provided with an output terminal 24 and a second sample and hold circuit 25 is provided incorporating a capacitor C3, and a switch means SW1 thereby the sample and hold circuit can sample the output of the peak hold circuit 22. The second sample and hold circuit is provided with an output terminal 26 and the output terminals 24 and 26 are interconnected by way of the series resistor combination R5 and R6. A point intermediate the resistors is connected to one input of a comparator 27 the other input of which is connected to the output of the differential amplifier 21.

The inverting input terminal of the amplifier 21 is connected by way of a resistor R4 to a feedback circuit 28 which includes a high gain amplifier having its non-inverting input terminal connected to the output terminal 24 of the first sample and hold circuit. A capacitor C4 interconnects the output terminal of the amplifier of the feedback circuit with its inverting input terminal and this is also connected by way of a resistor R7 to a reference voltage which is chosen so that it is close to ground potential. The feedback circuit 28 acts as an integrating network.

Referring now to FIG. 5, the control pulse 20 is utilized to drive the switches SW1, SW2 and SW3. The switches SW1 and SW3 are momentarily closed following the leading edge of the control pulse 20 while the switch SW2 is momentarily closed following the trailing edge of the pulse 20. Closure of the switch SW3 causes the capacitor C2 to be charged to the value of the output voltage of the differential amplifier. At the output terminal 24 therefore of the first sample and hold circuit, there appears a voltage equal to the output voltage VS1 of the differential amplifier when the spill valve is in the open position. As the valve starts to close the voltage across the capacitor C1 will start to increase the maximum voltage VS2 being attained when the spill valve is fully closed. The output voltage of the peak detector circuit 22 at the instant of closure of the switches SW1 and SW3 is that which is obtained when the spill valve is fully closed. When SW2 is momentarily closed by the falling edge of the control pulse 20 the peak detector circuit 22 is set to zero but it recharges rapidly to the voltage VS2 before the spill valve has time to reopen. Thus when switches SW1 and SW3 are next closed, the voltages at the terminals 24 and 26 correspond to the open and closed positions of the spill valve. The values of the resistors R5 and R6 are chosen to take into account the fact that the spill valve can be regarded as being effectively closed before it reaches the fully closed position and the comparator compares the divided voltage with the actual output voltage of the differential amplifier 21. When the two voltages are equal the comparator produces the corrected output signal VC seen in FIG. 5 the length of the pulses indicating the effective closure time of the spill valve.

The voltage at the output terminal 24 of the first sample and hold circuit is applied by way of the feedback circuit 28 to the differential amplifier 21.

Considering now the differential amplifier 21 and the feedback circuit 28.

The transfer characteristic of the differential amplifier is:

$$V_{O1} = (V_S - V_F)K$$

where
K is a constant determined by the resistors $R_1$–$R_4$ inclusive
$V_{O1}$ is the output voltage of the amplifier
$V_S$ is the input voltage from the transducer and
$V_F$ is a DC feedback voltage.

If $V_F = V_{S1}$ i.e. the input voltage from the transducer when the valve is fully open then:

$$V_{O1} = (V_S - V_{S1}) K$$

K can therefore be made high without saturating the amplifier. This is achieved by arranging the voltage $V_F$ to be such that $V_{O1}$ when the valve is fully open is close to ground potential.

The voltage $V_F$ is generated by comparing the output voltage $V_{O4}$ of the first sample and hold circuit with a reference voltage which has a value close to ground potential. If $V_{O4}$ rises above the reference voltage $V_F$ is increased until $V_{O4}$ is equal to the reference voltage and vice versa.

The values of resistor R7 and capacitor C4 have to be chosen with care to ensure stability of the system when the repetition rate of the control pulses 20 is low i.e. at low engine speeds.

In the engine overrun condition the control pulses 20 will cease because in this situation there will be no requirement for fuel. The switches SW1-2-3 will therefore remain open and the voltages $V_{O3}$ and $V_{O4}$ will remain essentially unchanged, their magnitudes being affected to only a small degree by the various leakage currents. The output voltage VF of the feedback circuit 28 may well change due to drift of the voltage $V_{O4}$ and when the control pulses 20 restart, voltage $V_{O1}$ may well be at an incorrect level if the output of the circuit 28 has shifted. However, when sampling starts the voltage $V_F$ will ramp in the direction required until the voltage $V_{O4}$ equals the value $V_{INT}$. Thus for a short period it is possible for the output voltage Vc to be incorrect, the length of the period depending upon the drift of voltage $V_F$, the control pulse period and the time constant of $C_4$ and $R_7$.

If the engine is stopped and then restarted the time required for the voltage Vc to be corrected will be longer because the capacitor C4 will have discharged.

The signal provided by the transducer 18 may move negatively instead of positively as shown. In this case the polarity of the diode in the circuit 22 is reversed, the switch SW2 would be connected to the positive supply and the reference voltage VINT would also be positive.

Other forms of transducer may be used such for example as a variable reluctance transducer and the transducers can be single ended as shown or double ended in which case a differential amplifier would be provided before the amplifier 21.

We claim:

1. A transducer means for sensing the movement of a component which can move between first and second extreme positions, the transducer means comprising an electrical transducer responsive to the movement of the componenet and for providing a transducer output signal and electrical circuit means which receives the output signal of the transducer and provides a corrected output signal when the component is at or near said second extreme postion, said circuit means comprising a differential amplifier having a pair of inputs one input of which being connected to receive the output signal of said transducer, a first sample and hold circuit having an input terminal connected to the output of the differential amplifier and having an output terminal and incorporating switch means operable when said component is at its first position to provide at its output terminal a voltage corresponding to the output voltage of the differential amplifier, a peak hold circuit having an input connected to the output of the differential amplifier and an output terminal and including switch means operable when said component is at its second position to reset the voltage at the output terminal of the peak hold circuit to zero, a second sample and hold circuit having an input terminal connected to the output terminal of the peak hold circuit and an output terminal and incorporating switch means operable when said component is at its first position to provide at its output terminal a voltage corresponding to the output voltage of the peak hold circuit, a resistor network connecting the output terminals of said first and second sample and hold circuits, a comparator, having first and second input terminals, said resistor network being connected to the first input terminal of said comparator the second input of the comparator being connected to the output terminal of the differential amplifier and a feedback circuit having an output terminal connected to the other input of the differential amplifier and an input terminal which is connected to the output terminal of the first sample and hold circuit, said comparator having an output terminal at which appears said corrected output signal.

2. A transducer means according to claim 1 in which said feedback circuit is an integrating circuit and means for supplying a reference voltage to the integrating circuit.

* * * * *